(12) United States Patent  (10) Patent No.: US 8,753,489 B2
Swartz et al.  (45) Date of Patent: Jun. 17, 2014

(54) ELECTROLYZING SYSTEM

(75) Inventors: Gregory John Swartz, Anthem, AZ (US); James B. Swartz, Noblesville, IN (US); James Ira Moyer, Kokomo, IN (US)

(73) Assignee: Spraying Systems Co., Wheaton, IL (US)

( * ) Notice: Subject to any disclaimer, the term of this patent is extended or adjusted under 35 U.S.C. 154(b) by 265 days.

(21) Appl. No.: 13/092,278

(22) Filed: Apr. 22, 2011

(65) Prior Publication Data

US 2011/0259760 A1   Oct. 27, 2011

Related U.S. Application Data

(60) Provisional application No. 61/326,869, filed on Apr. 22, 2010.

(51) Int. Cl.
*C02F 1/461* (2006.01)

(52) U.S. Cl.
USPC ............ 204/252; 204/253; 205/746; 205/748

(58) Field of Classification Search
USPC ........................................................ 204/252
See application file for complete search history.

(56) References Cited

U.S. PATENT DOCUMENTS

| 4,121,991 | A | * | 10/1978 | Miller et al. .................. 204/260 |
| 4,252,628 | A | | 2/1981 | Boulton et al. |
| 5,595,641 | A | | 1/1997 | Traini et al. |
| 5,891,328 | A | | 4/1999 | Goldstein |
| 8,062,500 | B2 | * | 11/2011 | Sumita .......................... 205/628 |
| 2005/0161343 | A1 | | 7/2005 | Reinhard |
| 2012/0012466 | A1 | * | 1/2012 | Sperry et al. .................. 205/334 |

FOREIGN PATENT DOCUMENTS

WO  PCT/US2009/032301 A1   8/2010
WO  PCT/US2011/33528          7/2011

* cited by examiner

*Primary Examiner* — Keith Hendricks
*Assistant Examiner* — Salil Jain
(74) *Attorney, Agent, or Firm* — Leydig, Voit & Mayer, Ltd.

(57) ABSTRACT

An electrolyzing system for electrolyzing a brine solution of water and an alkali salt to produce acidic electrolyzed water and alkaline electrolyzed water is provided. The system includes an internal chamber for receiving the brine solution and two electrolyzer cells immersed in a brine bath. Each electrolyzer cell includes an electrode, at least one ion permeable membrane supported relative to the electrode to define a space communicating between a fresh water supply and a chemical outlet into which brine enters only through the membrane. One of the electrodes is coupled to a positive charging electrical supply and the other to a negative charging electrical supply.

8 Claims, 17 Drawing Sheets

US 8,753,489 B2

ELECTROLYZING SYSTEM

BACKGROUND OF THE INVENTION

Systems are known that electrolyze water containing alkali salts to produce acidic electrolyzed water and alkaline electrolyzed water. Acidic electrolyzed water, which typically has a pH between about 2.0 and about 3.5, is a strong sterilizing agent that is increasingly used in a variety of sanitizing applications including in the medical, agricultural and food processing industries and in other institutional environments. The alkaline or basic electrolyzed water also has a sterilizing as well as a detergent effect and is useful in cleaning oil and grease stains. Sodium chloride is commonly used as the alkali salt that is dissolved in the water because it produces acids and bases that are environmentally friendly, potent and low in cost.

Commercially available water electrolyzing systems have a number of drawbacks. One such system has only a single ion membrane that separates the brine from the electrolyzed water. Such systems tend to have high levels of salt in the acidic solution which can lead to scale buildup and reduce the shelf life of the acidic solution. Another system is membraneless and depends on removing the acidic and alkaline solutions at precise geometric points along the flow of the brine.

Yet another system uses a three chamber structure including an anode chamber, a cathode chamber and an intermediate chamber arranged between the anode and cathode chambers. The intermediate chamber is separated on each side from the anode and cathode chambers by an electrode plate, a membrane and a rigid plate construction. Each of the electrode plates has a plurality of openings therein to allow positive or negative ions to pass into the anode and cathode chambers respectively. Each of the rigid plates has striped depressions and projections along with a number of openings to channel the water in the intermediate chamber to the areas of the openings in the electrode plates.

While the three chamber structure effectively minimizes salt in the acidic output, this system has a complex structure of rigid guide plates that can impede the free flow of ions into the anode and cathode chambers limiting the efficiency of the system. The openings in the electrodes also has an adverse effect on the consistency of the electric fields further hampering the efficiency of the system.

DETAILED DESCRIPTION OF THE INVENTION

Figure 1:
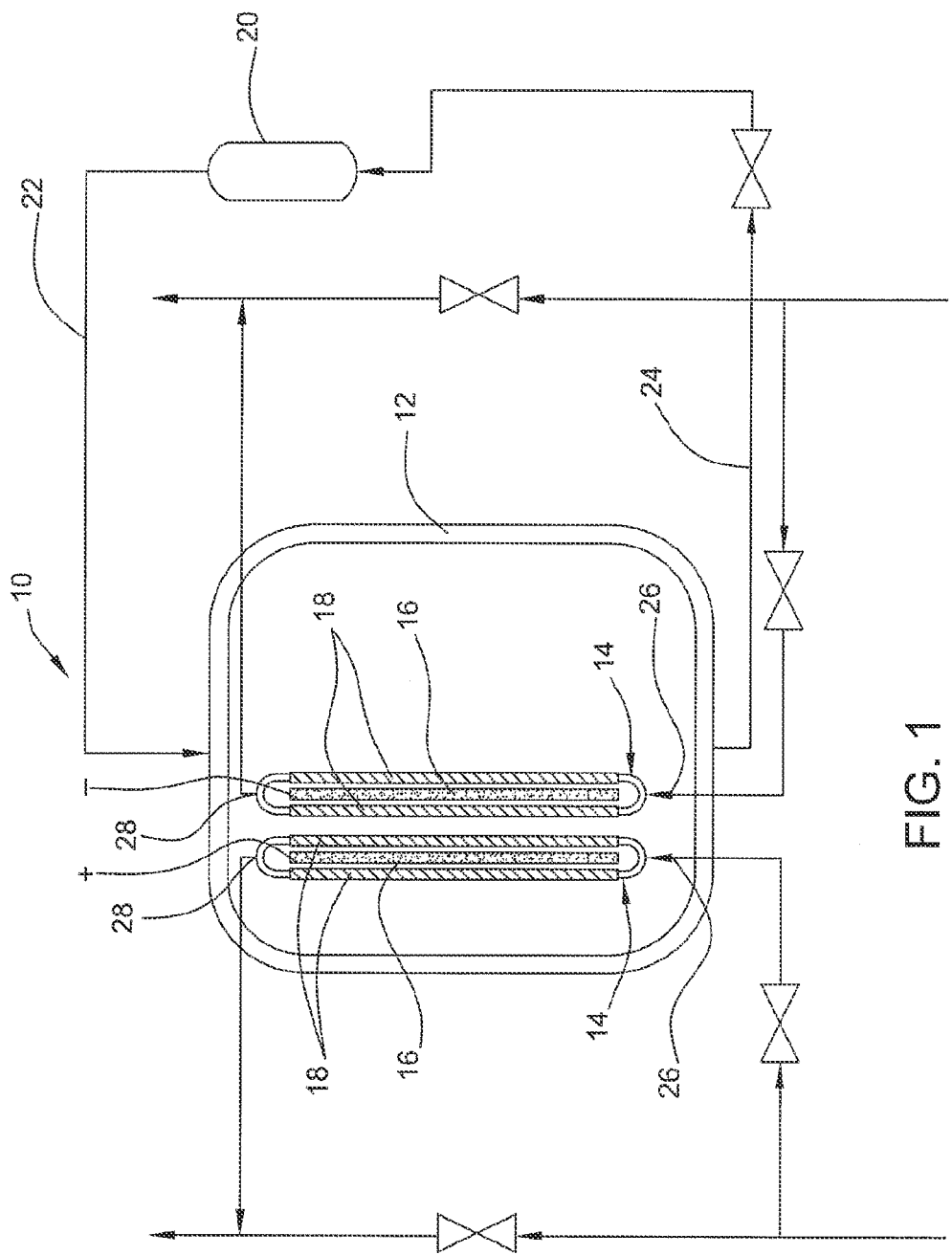
FIG. 1 is a schematic drawing of an exemplary electrolyzing system according to the present invention.

Referring now to FIG. 1 of the drawings, there is shown an illustrative embodiment of an electrolyzing system 10 constructed in accordance with the teachings of the present invention. The illustrated electrolyzing system 10 is operable to electrolyze a solution of water and an alkali salt to produce acidic electrolyzed water and/or alkaline or base electrolyzed water. Both acidic electrolyzed water (acid sanitizer) and alkaline electrolyzed water (base cleaner) have beneficial sterilizing and cleansing properties making them useful in a variety of applications including medical, agricultural, food processing and institutional. According to one embodiment, the water and salt solution is a saline or brine solution comprising water and NaCl. Electrolysis of a brine solution produces hypochlorous acid as the acid sanitizer and sodium hydroxide as the base cleaner. As will be appreciated by those skilled in the art, the present invention is not limited to electrolysis of any particular solution or use in any particular application.

In accordance with an important aspect of the present invention, the electrolyzing system 10 incorporates an open brine bath 12 into which one or more electrolyzer cells 14 are immersed with substantially all sides of the cells open to the brine. The use of an open brine bath 12 with immersed electrolyzer cells 14 eliminates the need for any obstructive intermediate chamber thereby allowing fluid to flow more freely through the system. It also eliminates the need for complex guides to direct the flow of fluid thereby simplifying the design as well as increasing its efficiency. In the schematic drawing of FIG. 1, the brine bath 12 includes two cells 14 one incorporating a positively charged electrode plate 16, i.e. an anode, and one incorporating a negatively charged electrode plate 16, i.e. a cathode. The cells 14 are configured to electrolyze the brine in the bath 12 and thereby draw in positively and negatively charged ions into the respective cells 14. To this end, ion permeable membranes 18 are provided on each side of the electrode plate 16 in each cell 14. Arranging membranes 18 on either side of each plate 16 increases the production achievable with each plate 16 by allowing ions to be drawn into the cell 14 from wither side of the electrode plate.

To allow for the flow of ions towards the electrode plate 16, the membranes 18 are ion permeable. In particular, positive ion exchange membranes 18, i.e. anion permeable membranes, are provided for negatively charged electrodes 16 and negative ion exchange membranes 18, i.e. cation permeable membranes, are provided for positively charged electrodes 16. The membranes 18 are configured to permit ions to pass therethrough but not the salt or the water. As is understood by those skilled in the art, minimizing the amount of salt in particularly the acidic electrolyzed water, e.g., hypochlorous acid, extends the shelf life of the resultant acid sanitizer product and reduces equipment damage due to corrosion. According to one preferred embodiment, the membranes 18 are double sided and have a rigid yet porous structure between them.

To ensure a uniform and optimal electric field intensity, the electrode plate 16 in each cell 14 can have a solid construction. The use of a solid construction is made possible by the open bath 12 with the immersed electrolytic cell 14 configuration. Some commercially available electrolyzing systems that utilize electrode plates with a plurality of openings therein to permit the passage of ions. Those openings, however, can produce dead zones in the electric field produced by the electrode. The design of the system of the present invention allows for the use of solid electrode plates 16 that do not have any openings therein. As a result, the electric fields produced by the electrode plates 16 are more uniform and consistent thereby allowing the system to operate more efficiently.

A simplified system 10 according to the invention is shown schematically in FIG. 1. In the system of FIG. 1, a brine supply 20 is provided that is connected to the bath 12 via a brine supply line 22. A brine recirculation line 24 is also provided which draws spent brine out of the bath 12 and returns it to the brine supply 20. As a result of this arrangement, brine is circulated through the bath 12 and around and past the electrolytic cells 14. As the brine passes the electrolytic cells 14, it is subject to an electrolysis reaction with the negatively charged ions being drawn into the cell 14 with the positively charged electrode plate 16 and the positively charged ions being drawn in the cell with the negatively charged electrode plate 16. Each of the electrolytic cells 14 has a fresh water inlet end 26 that is connected to a supply of fresh water that is directed into the interior space in the cell 14 between the membranes 18 and the electrode plate 16. In the cell 14, the fresh water mixes with the ions drawn into the cell to form either the acid sanitizer (in the cell 14 with the positively charged plate 16) or the base cleaner (in the cell 14 with the negatively charged plate 16). Each cell 14 has a chemical outlet end 28 that is connected to a line for drawing the chemicals (acid sanitizer or base cleaner) out of the cell 14. The flow of the brine, fresh water and finished chemicals through the system can be controlled by appropriate pumps.

Figure 2:
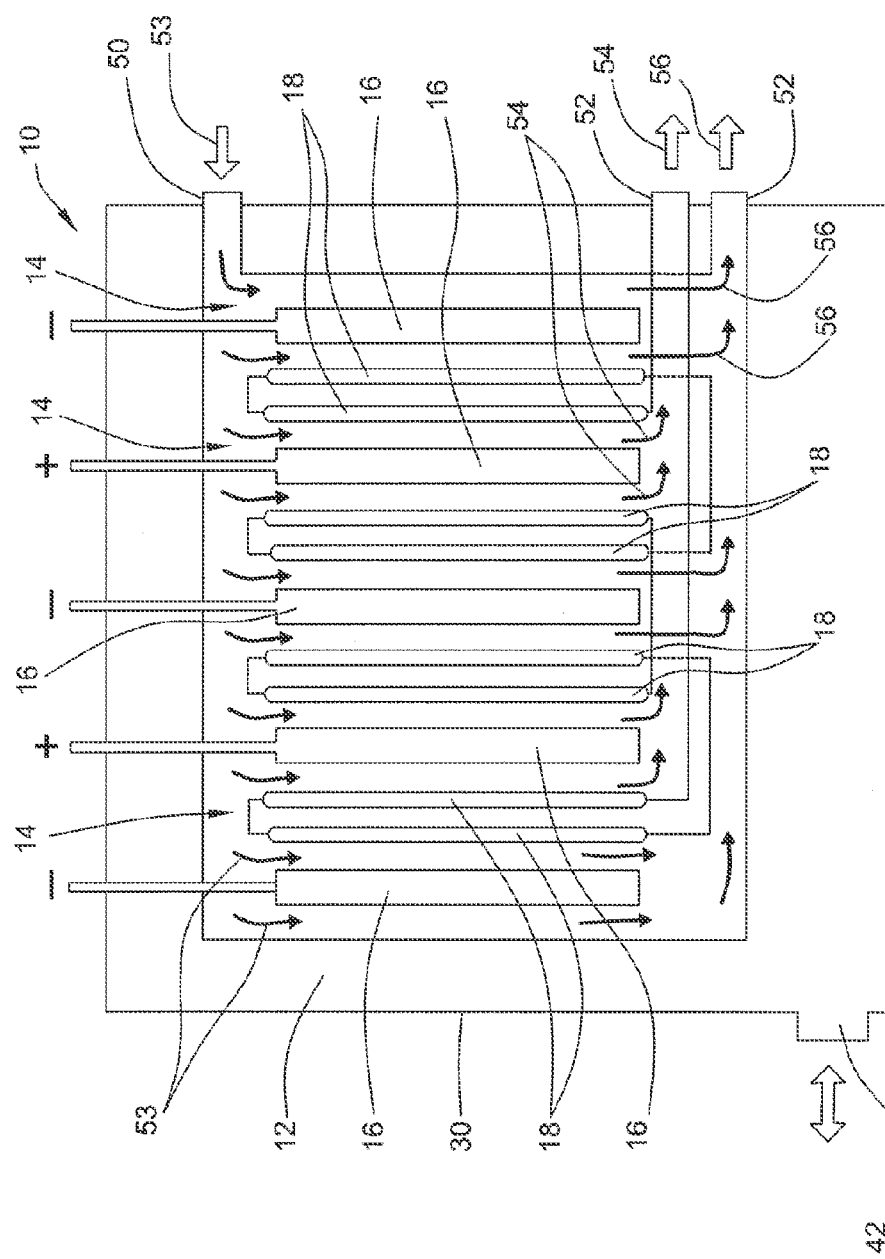
FIG. 2 is a schematic drawing of a more specific exemplary embodiment of an electrolyzing system according to the present invention.
Figure 3:
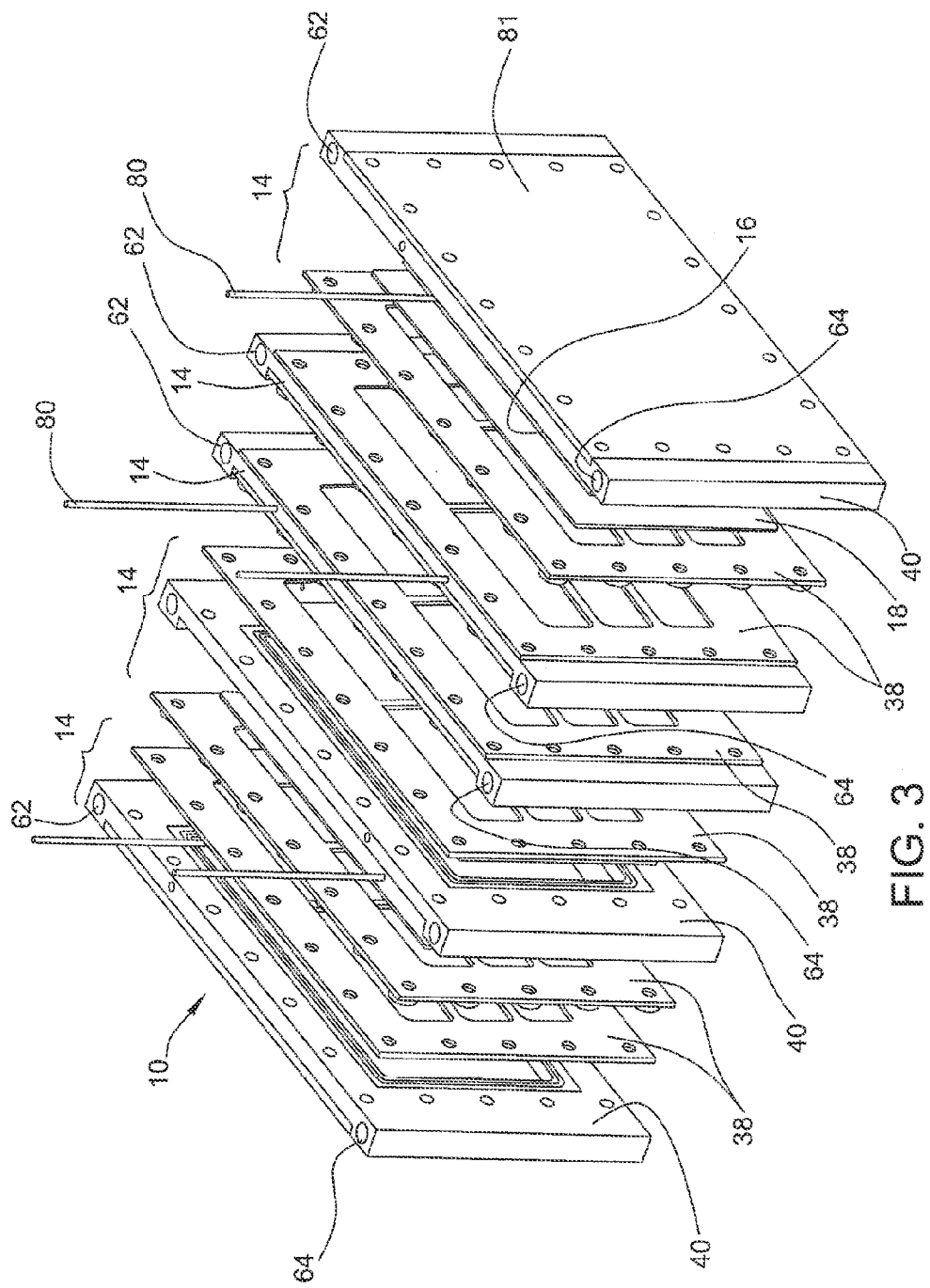
FIG. 3 is an exploded view of the electrolytic cells of the electrolyzing system of FIG. 2.
Figure 4:
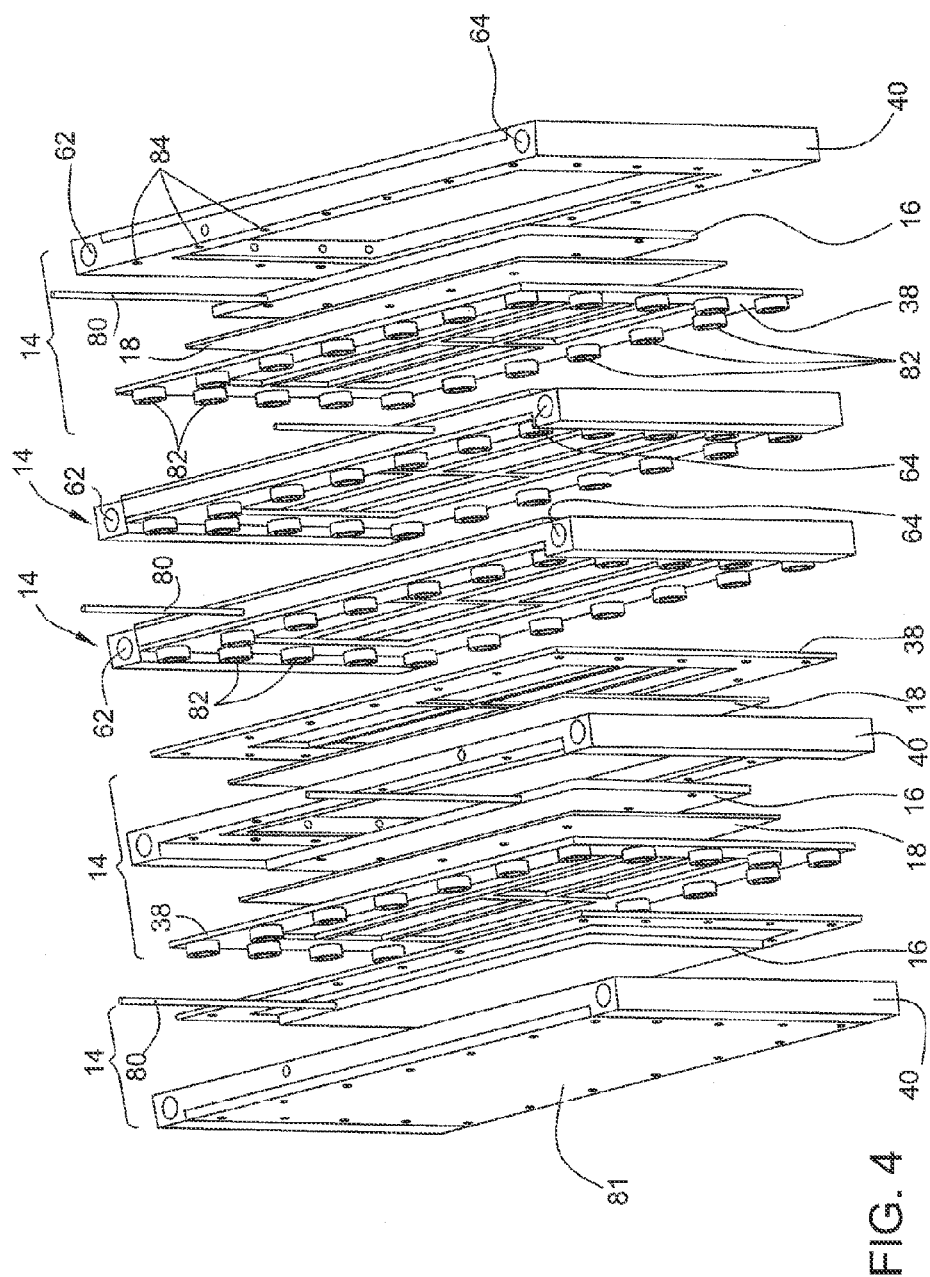
FIG. 4 is another exploded view of the electrolytic cells of the electrolyzing system of FIG. 2.

To enable the system to be easily scaled to a desired production rate of acid sanitizer and/or base cleaner, the electrolytic cells 14 can have a modular design with each cell comprising a separate self-contained cartridge that permits multiple cells to be assembled together. This permits the system to be scaled to the desired production rate simply by adding or subtracting additional cells or cartridges. An illustrative embodiment of a system including such modular cells 14 is shown in FIGS. 2-4. As shown in the schematic diagram of FIG. 2, the illustrated embodiment includes a total of five electrolytic cells 14 (three negatively charged and two positively charged) arranged in a manifold type arrangement in a brine bath 12. The cells 14 are generally rectangular in shape and are received in a rectangular housing 30 that defines the brine bath 12. As shown in FIG. 2, the illustrated embodiment includes five cells 14, however, it will be understood that the more or less cells could be provided. For example, a system with only three cells could be provided that had either a 2:1 acid sanitizer to base cleaner production rate or a 2:1 base to acid production rate. Typically, adjacent cells 14 would have one positively charged electrode plate 16 and one negatively charged electrode plate 16, so that during operation, the positively charged ions would flow through the membrane 18 of one cell 14 toward the negatively charged plate 16 and the negatively charged ions would flow through the membrane 18 of the adjacent cell 14 toward the positively charged plate 16. While the assembly of several cells 14 into a manifold type arrangement is shown, it will be appreciated that the cells could be independently submerged in the brine bath 12 as each of the individual cells is designed to be self-contained.

The illustrated brine bath 12 includes a brine inlet/outlet 42 at the lower end of the bath housing 30 through which brine can be introduced into and drawn out of the bath 12. The bath housing 30 further includes a fresh water inlet 50, in this case, near the upper end of the housing that can be in communication with a fresh water supply. The inletting fresh water is shown by the arrow 53 in FIG. 2. As described in greater detail below, the fresh water introduced through the fresh water inlet 50 is directed into the individual electrolytic cells 14 wherein it mixes with the positively and negatively charged ions drawn through the membranes 18 to form the acid sanitizer and base cleaner. The bath housing 30 further includes outlets 52 for the formed chemicals arranged in the illustrated embodiment at the lower end of the bath housing. The outletting acid sanitizer is referenced with the arrow 56 and the outletting base cleaner is reference with the arrow 54 in FIG. 2. In this case, the water/chemicals flow downward from the top of the cells 14 and exit at the bottom of the cells 14. The flow of water/chemicals through the interior of the cells 14 is shown diagrammatically with arrows in FIG. 2 with the flow of the water being shown with arrows 53, the flow of the base cleaner being shown with arrows 54 and the flow of the acid sanitizer being shown with arrows 56.

Referring to FIGS. 3 and 4 of the drawings, a pair of exploded views are provided which show the construction of the electrolytic cells 14 shown in FIG. 2. In FIGS. 3 and 4, two of the cells 14 in the middle of the manifold are shown unexploded while the other three have been exploded to better show the components of each cell. In this case, each cell 14 includes an electrode plate 16 that is either positively or negatively charged. To this end, each electrode plate 16 has an attached lead 80 that can be connected to a suitable electrical supply. While the electrode plates 16 can have a solid construction as discussed above, the electrodes 16 could also employ a honeycomb-like structure featuring a plurality of openings in the electrode as well as a non-flat, such as a dimpled, configuration. Such a construction can have the advantage that it disrupts and introduces turbulence into the flow of fresh water as it passes over the electrode 16. It is thought that this additional turbulence may help the efficiency of the system.

In the illustrated embodiment, the three cells 14 in the middle of the manifold each have an ion exchange membrane 18 on either side of the electrode 16. The two outmost cells 14 each have only one membrane 18 with a blank wall 81 being provided on the other side of the cell 14 to define the edge of the cell manifold. To ensure adequate spacing is provided between the adjacent cells 14 as well as to support the membranes 18, membrane supports 38 can be provided on the outer surface of each of the membranes 18. These membrane supports 38 enable each cell 14 to be arranged together with an immediately adjacent similarly constructed cell 14 to create the manifold type arrangement of two or more cells. The illustrated membrane supports 38 have a window-like configuration with six large openings through which the brine can access the membrane 18. In this embodiment, cylindrical outer spacers 82 (see FIG. 4) are arranged on an outer face of every other membrane support 38 in the manifold and engage the outer face of the membrane support 38 of the adjacent cell 14 so as to create space between the adjacent cells 14 into which the brine can permeate.

To facilitate the attachment of the membranes 18 to the electrode plates 16 and to ensure adequate spacing between the membranes 18 and the electrode plate 16, each cell 14 further includes a cartridge housing 40 which provides a structure to which the electrode 16, membrane 18 and membrane supports 38 can be attached. The cartridge housings 40 have a generally window like configuration and are constructed in such a manner that when the membranes 18 and electrode 16 are connected thereto sufficient space is provided between the electrode 16 and the membrane 18 to permit the flow of freshwater through the cell 14 and into which ions can be drawn to produce the base cleaner and acid sanitizer. The interior space in the cells 14 between the membranes 18 and the electrode plates 16 into which the charged ions are drawn are sealed off from the brine bath 12 such that the only flow path from the bath 12 into the interior spaces is through the membranes. The illustrated configuration of the cartridge housings 40 limits the points of contact between the cartridge housings 40 and the electrode 16 and the cartridge housings 40 and the respective membrane 18 and thereby defines open spaces in the area between membranes 18 and the electrode plate 16. Advantageously, the membranes 18 are largely unobstructed by the cartridge housings 40 and the membrane supports 38 and the membranes 18 are not directly attached to the electrode plates 16 so as to allow maximum ion transfer from the brine bath 12 to the cell 14. As described further below, the lack of obstructions to the membranes 18 also allows for fluid to be constantly refreshed at the membrane surfaces helping to further increase the efficiency of the system 10. As will be appreciated by those skilled in the art, other types of arrangements could be used to provide the spacing between the membranes and the surfaces of the electrode plates. For example, raised dimples could be provided on the electrode plate or polyurethane standoffs could be provided.

To facilitate the flow of water/chemicals through the cells 14, each cell includes a fresh water distribution channel 62, in this case, through an upper edge of the cartridge housing 40. The fresh water distribution channel 62 communicates with the space between the electrode 16 and the membranes 18 (or membrane if only one is provided) via series of passages 84 that extend through the cartridge housing 40 from the distribution channel 62 and communicate with the area between the electrode 16 and the membranes 18. The openings for these passages 84 are best shown in FIG. 4. Similar passages are provided at the other end of the cartridge housing 40 to allow the now formed acid sanitizer or base cleaner to pass into a chemical collection chamber 64 that extends through the lower edge of the cartridge housing 40. The fresh water distribution channels 62 for each cell 14 are in communication with the fresh water inlet 50 to the housing 30 as shown schematically in FIG. 2. Likewise, the chemical collection channels 64 for each cell 14 are in communication with the appropriate chemical outlet 52 as also shown schematically in FIG. 2. As each cell 14 has its own fresh water distribution channel 62 and chemical collection chamber 64, each cell can be considered to be self-contained in that it simply needs to be immersed in the brine bath and connected to a fresh water source and to a finished chemical outlet.

While the embodiment illustrated in FIGS. 2-4 shows the fresh water being introduced and the chemicals drawn off at opposite ends of the cells 14, the cells 14 and system 10 could be configured such that the water is introduced and the chemicals drawn off from the same end of the cells. In such a case, the cells 14 and system 10 could be designed such that the water is introduced on one side of the electrode 16 and then travels down one side of the electrode. At the bottom of the cell 14, the water/chemicals is transferred to the other side of the electrode 16 where it travels up the opposite side of the electrode. The chemicals are then drawn off at the same end of the cell 14 at which the water was first introduced, but on the opposite side of the electrode 16.

While the illustrated electrode plates, and the corresponding membranes, have rectangular configurations, those skilled in the art will appreciate that other configurations could also be used. According to one preferred embodiment, the electrodes and the membranes can be approximately 20 mm thick and the membranes can be approximately 0.018 inches thick and be able to withstand an 80 psi pressure differential across the membrane. The precise distances between the membranes and electrodes of a given cell and the electrodes of adjacent cells can be optimized through the sizing of the cartridge housings and the membrane supports to reduce energy loss from resistive losses in the fluids.

To provide precise control of formation of the acid sanitizer/base cleaner in the cells 14, including the desired pH, the water flow through the inner spaces between the membranes 18 and electrode plates 16 can be regulated with an appropriate control system. For example, if the electrolyzing system is configured to electrolyze a saline or brine solution of NaCl and water, the control system can be used to regulate the water flow and the electrical current so as to control the formation of the acid sanitizer and base cleaner at the desired production rate and at the desired pH. The same or a different control system can be used to control the supply of brine in the bath, including providing replenishment of the supply of brine in the bath during operation. The control system can include pumps for the water and brine, valves and suitable electronic controls.

Figure 5:
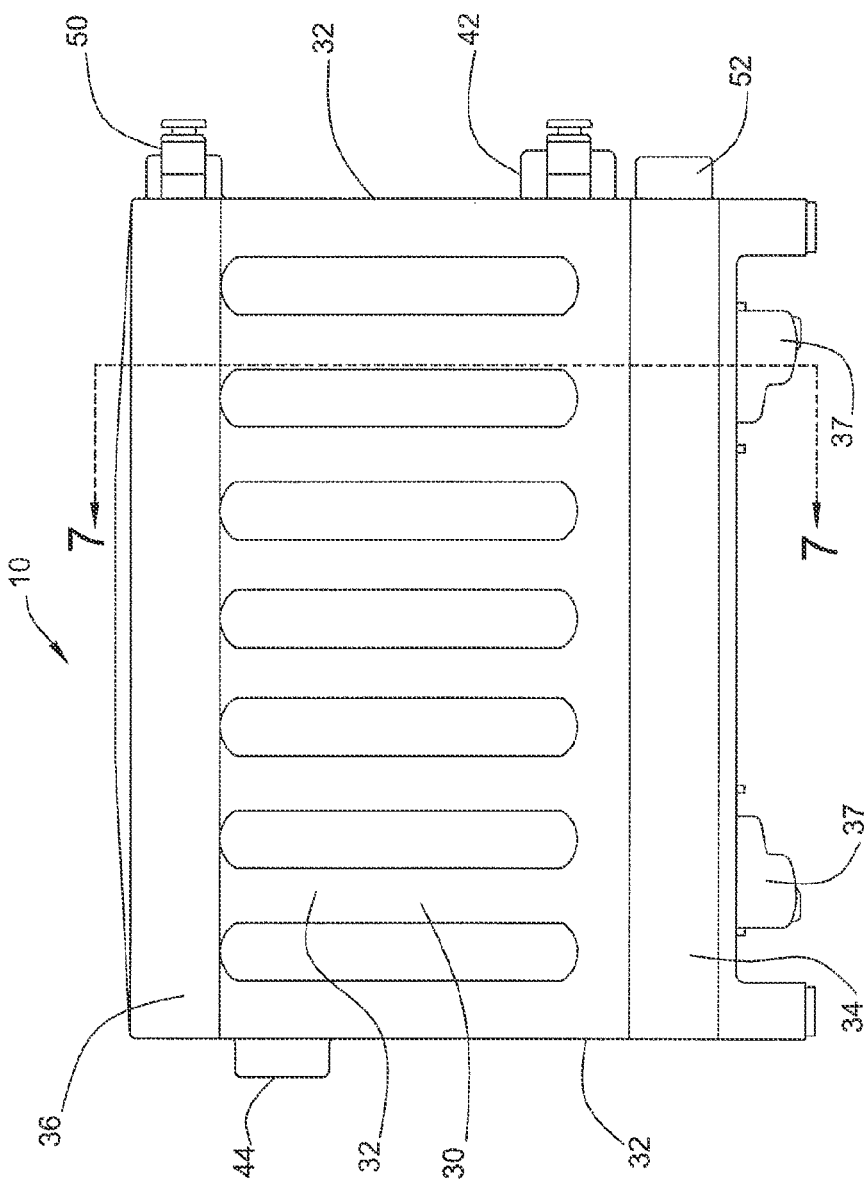
FIG. 5 is a side view of an alternative embodiment of an electrolyzing system.
Figure 6:
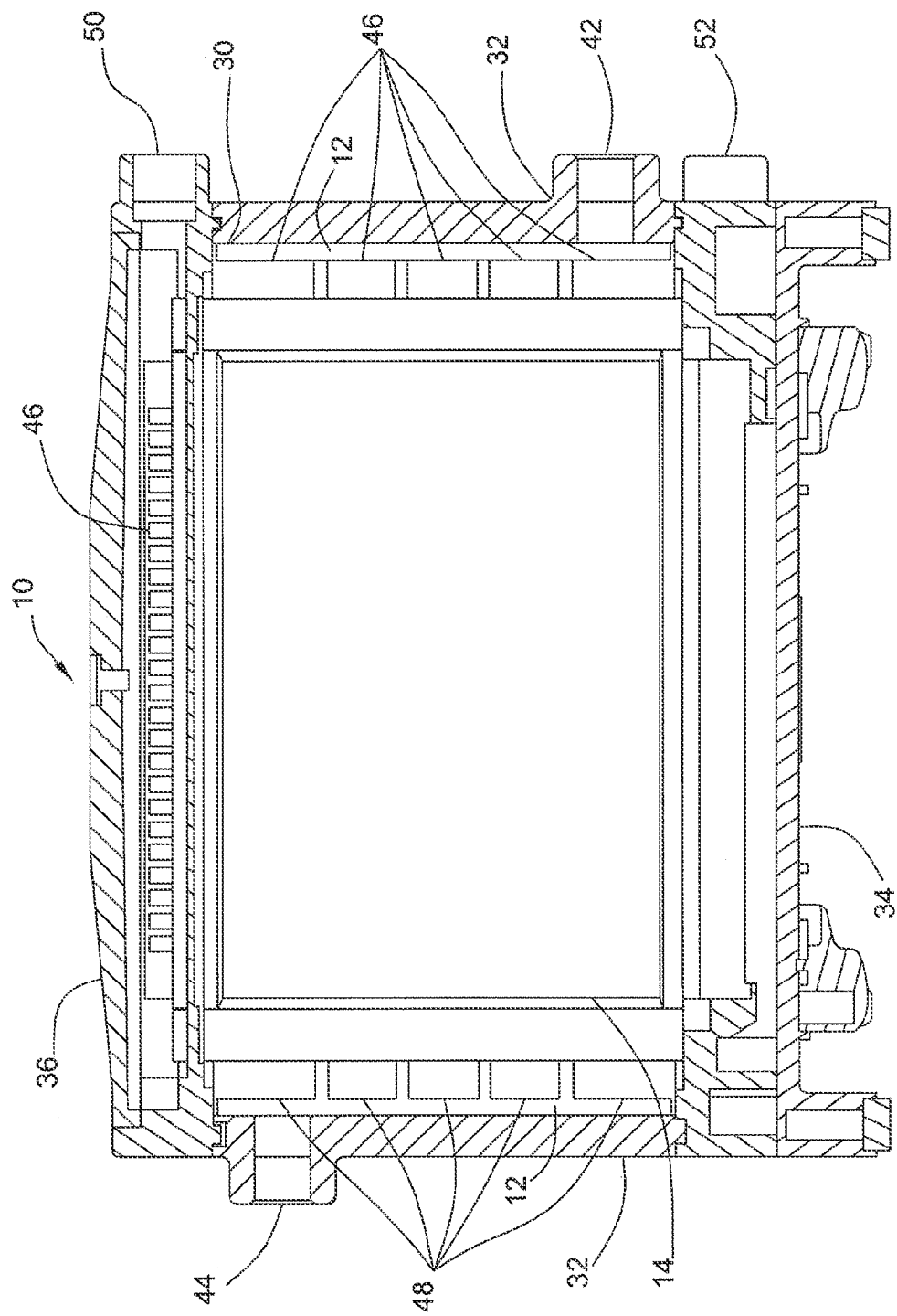
FIG. 6 is a side sectional view of the electrolyzing system of FIG. 5.
Figure 7:
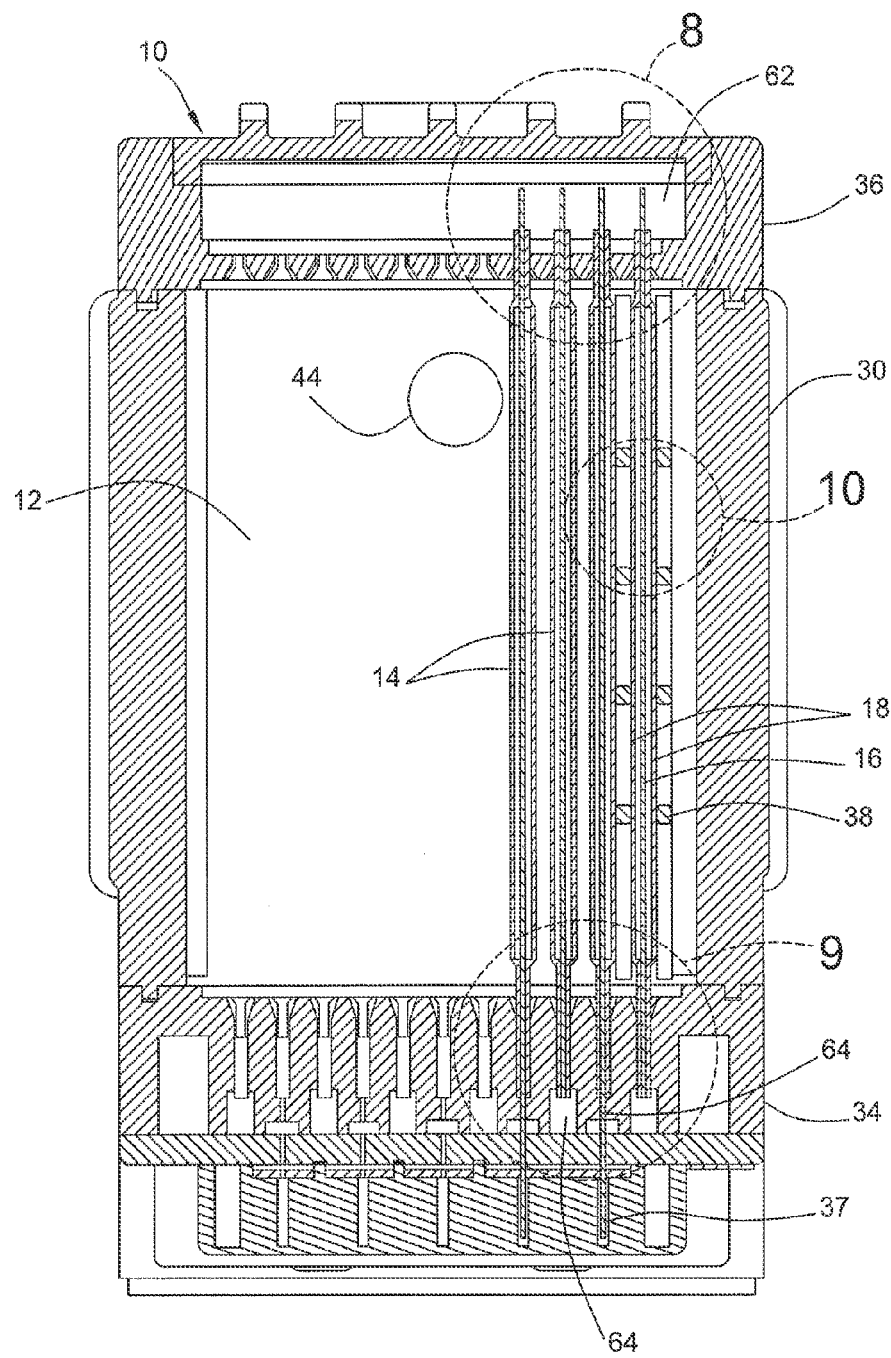
FIG. 7 is cross-sectional view of the electrolyzing system of FIG. 5 taken along the line 7-7 in FIG. 5.

An alternative embodiment of an electrolyzing system 10 is shown in FIGS. 5-14. The embodiment of 5-14 has similarities to the embodiment shown in FIGS. 2-4 and for ease of reference like components have been given the same reference numbers in the Figures. In the illustrated embodiment, each cell 14 includes either a positive or negatively charged electrode plate 16 with membranes 18 arranged on both of the flat sides of the plate. The illustrated housing 30 includes four side walls 32 and attaches to a lower base 34 and an upper cap or cover 36. In this instance, the electrolytic cells 14 are arranged in an upright manner in the bath 12 and extend between the base 34 and the cover 36 and electrical connections 37 (see FIGS. 5 and 7) for the electrode plates 16 are provided in the base 34. The cells 14 are supported in the housing 30 in parallel closely spaced relation to each other in a manifold type arrangement. As shown in FIG. 7, the illustrated embodiment includes four cells 14.

Figure 9:
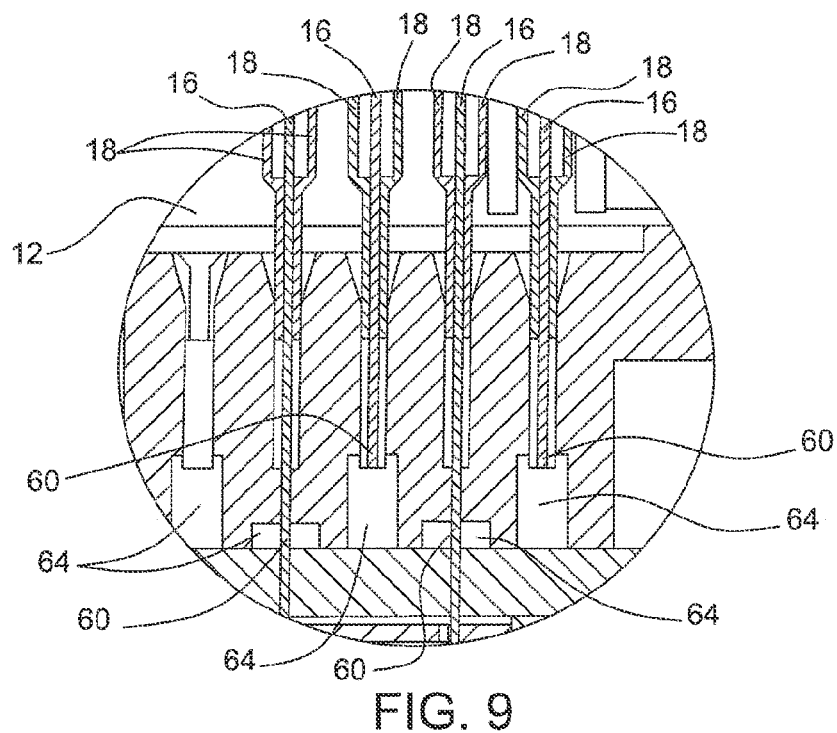
FIG. 9 is an enlarged detail view of the ends of the electrolytic cells of the embodiment of FIG. 5 at the finished chemical product outlet side of the system.
Figure 10:
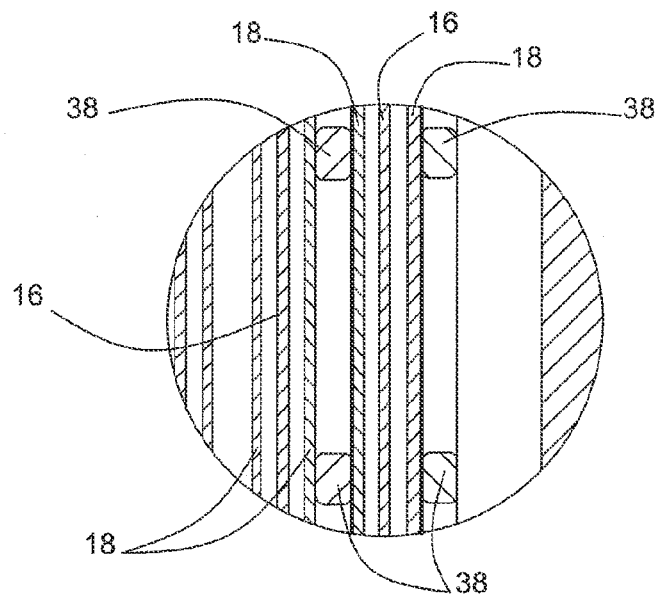
FIG. 10 is an enlarged detail view of electrolytic cells of the embodiment of FIG. 5.
Figure 11:
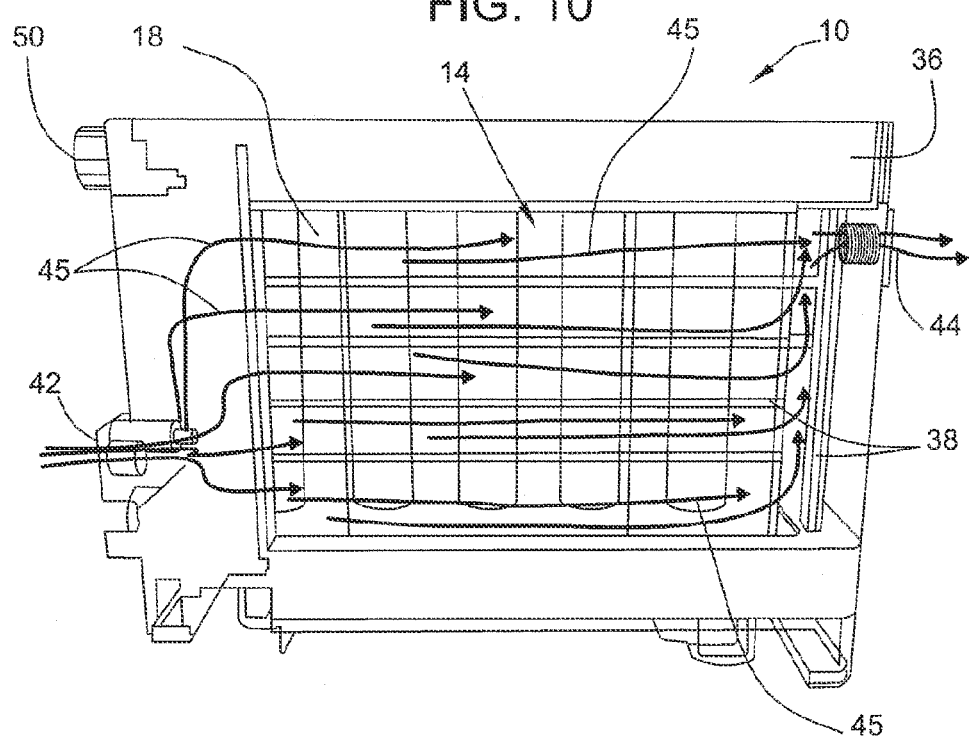
FIG. 11 is a partially cutaway side perspective view showing the brine flow through the electrolyzing system of FIG. 5.
Figure 12:
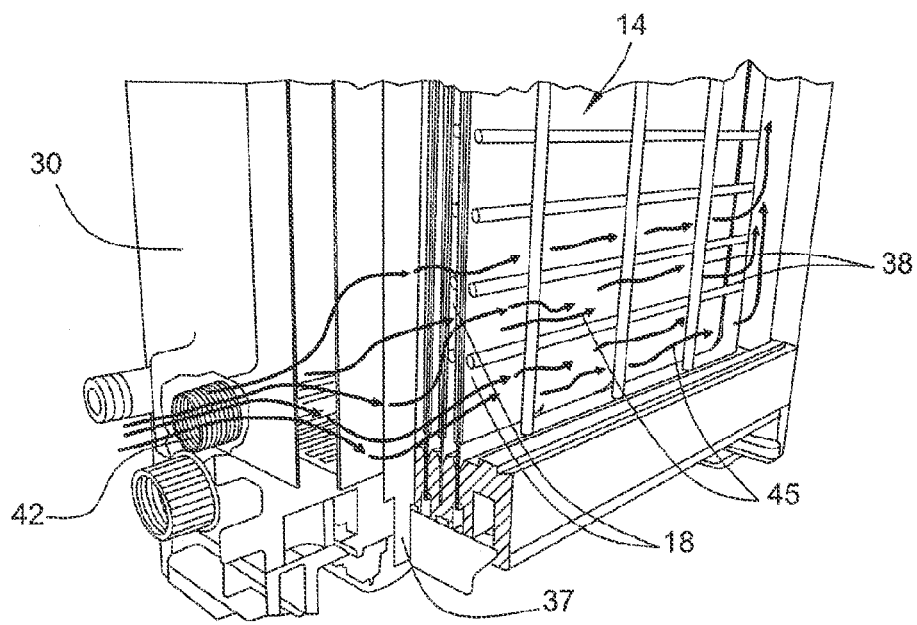
FIG. 12 is a partially cutaway end perspective view showing the brine flow through the electrolyzing system of FIG. 5.
Figure 15:
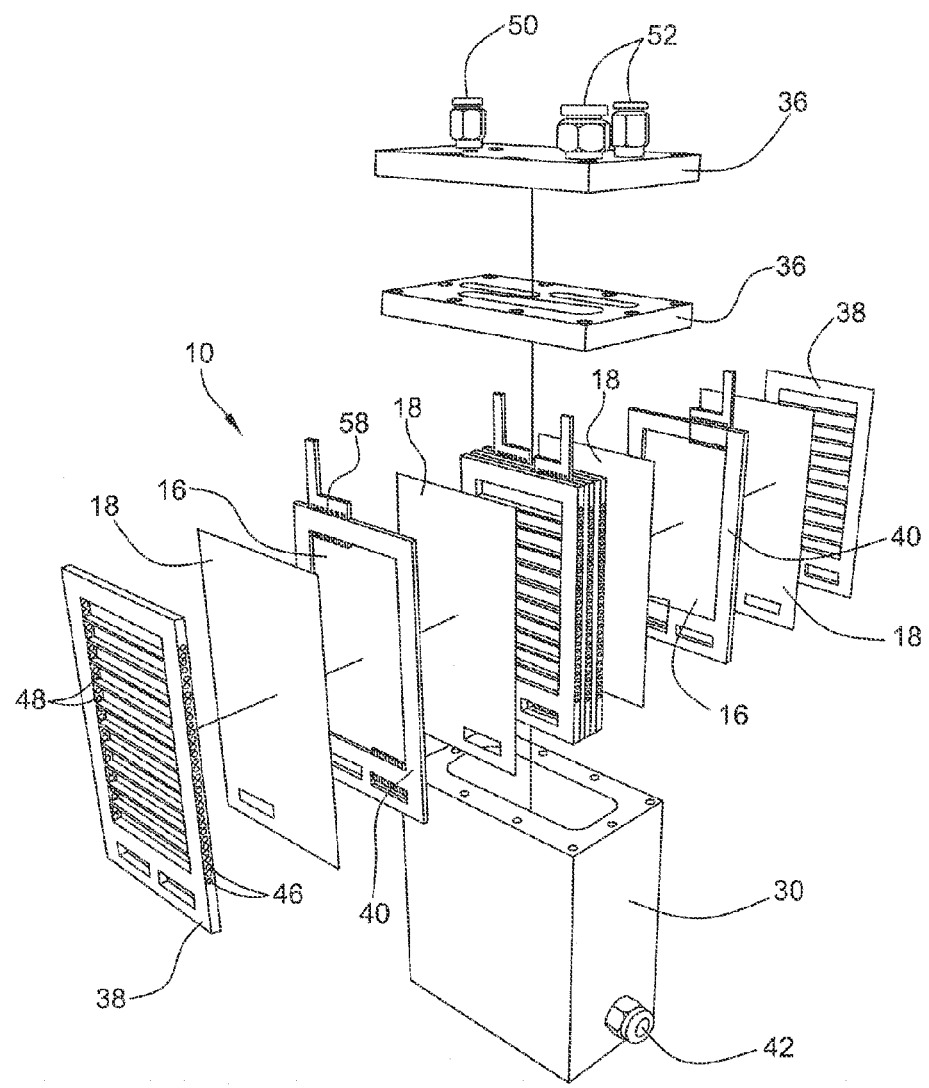
FIG. 15 is an exploded perspective view of another alternative embodiment of an electrolyzing system.
Figure 16:
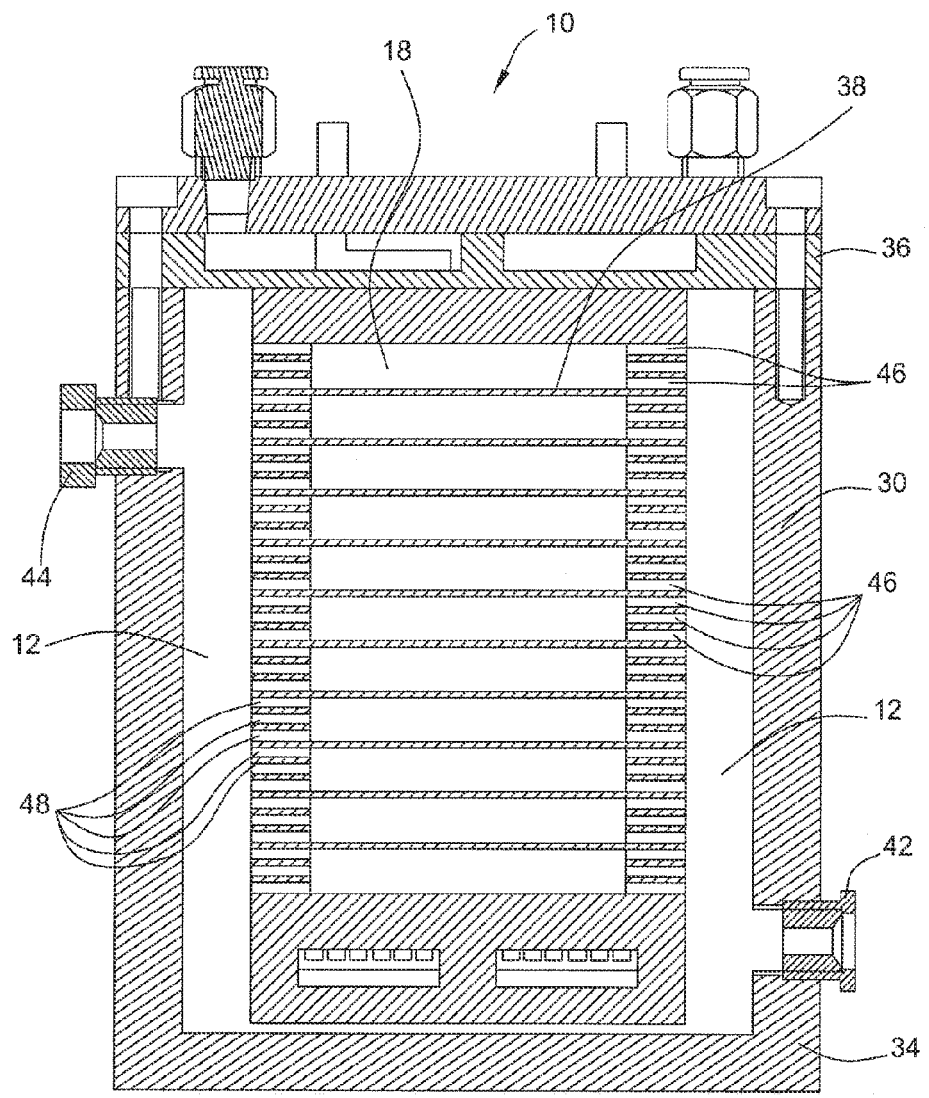
FIG. 16 is a side sectional view of the electrolyzing system of FIG. 15 showing the brine flow passages.
Figure 17:
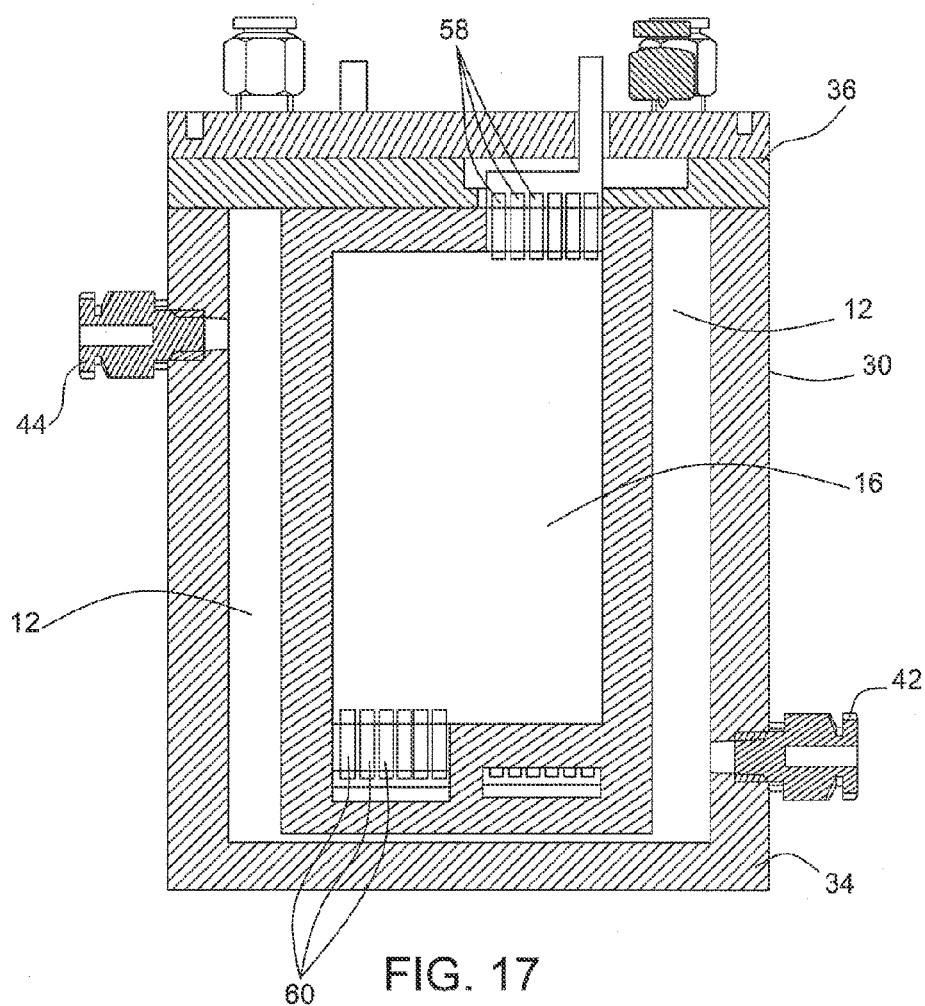
FIG. 17 is a side sectional view of the electrolyzing system of FIG. 15 showing the water and chemical flow passages between the membrane and the electrode plate.
Figure 18:
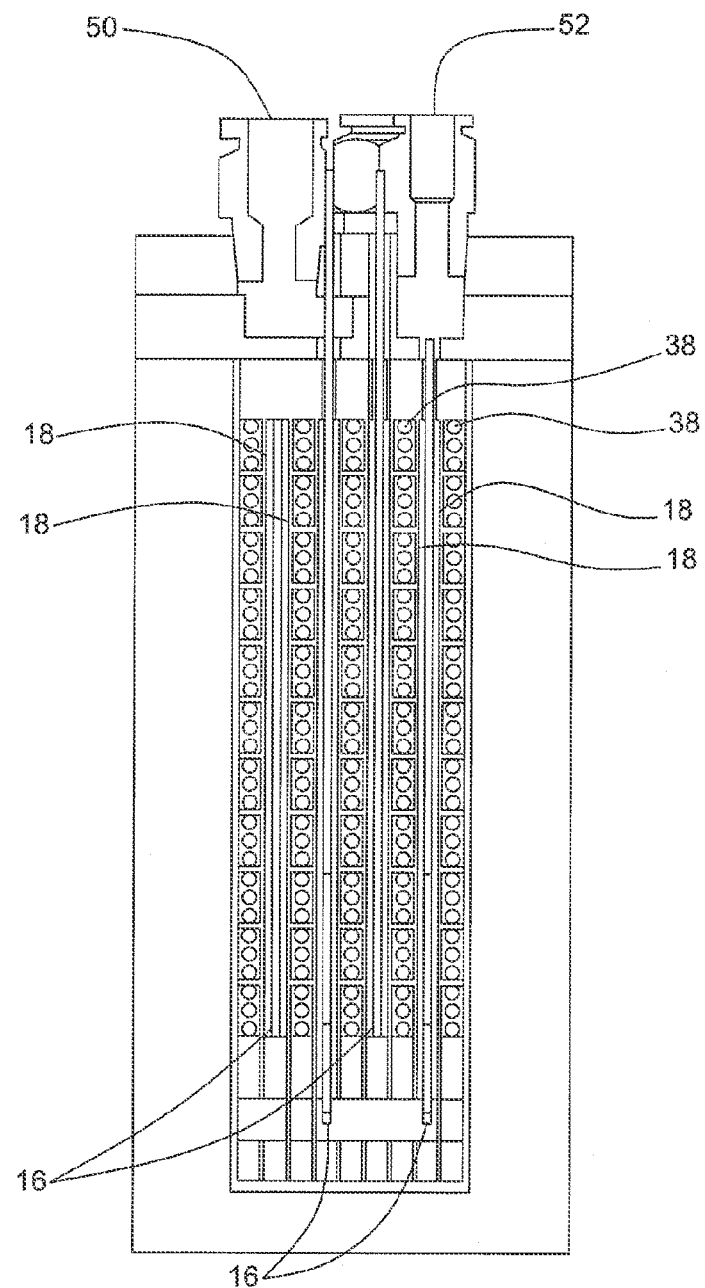
FIG. 18 is a lateral section view of the electrolyzing system of FIG. 15 showing the electrolytic cells of the electrolyzing system of FIG. 15.

Membrane supports 38 are provided on the outer surface of each of the membranes 18 as best shown in FIGS. 7 and 10. In this embodiment, when the cells 14 are assembled together in a manifold type arrangement, a single membrane support 38 can be provided between adjacent cells 14 in order to provide support for the membranes 18 of the adjacent cells 14 as shown in FIG. 10. The membrane supports 38 can provide a window pane-like configuration with legs extending around the perimeter of the respective membrane 18 and cross-members that extend between two of the legs so as to define open spaces between the membranes 18 of adjacent cells (see, e.g., FIGS. 11 and 12). First cartridge housings 40 can also be provided on either side of each electrode plate 16. The membrane 18 can be attached to each of the cartridge housings 40 so that the membrane 18 is spaced a distance from the corresponding surface of the electrode plate 16 thereby defining an interior space in the cell 14. This spacing is best shown in FIG. 10. As shown in the embodiment of FIG. 15, which utilizes the same cartridge housing 40 construction that can be used in the embodiment of FIGS. 5-14, the cartridge housings 40 can provide a window pane-like configuration with legs extending around the perimeter of the electrode plate 16.

In operation of the embodiment of FIGS. 5-14, fresh brine is fed to the bath 12 in the interior of the housing 30 through an inlet 42 provided on one of the sidewalls 32 of the housing (see FIGS. 5 and 6). The brine flows past the outer surface of the membranes 18 of a cell 14 on either side of the respective electrode plate 16 to a brine outlet 44 provided, in the illustrated embodiment, on the opposing sidewall 32 of the housing. The flow of brine between the inlet and outlet 42, 44 is shown diagrammatically with arrows 45 in FIG. 11. To facilitate the flow of brine past the membranes 18 of the cells 14, the membrane supports 38 each have a plurality of brine flow entry 46 and exit passages 48 (see FIG. 6) therein that permit fluid flow through the membrane supports 38, in this case, in a direction parallel to the surface of the membranes 18 and between the cross-members of the membrane supports 38 (see FIG. 12). These flow passages 46, 48 allow the brine to pass into the area between the membranes 18 of adjacent cells 14 and thereby around the individual cells 14.

The interior of the cells 14 between the membranes 18 and the electrode plate 16 are in fluid communication with a source of water that mixes with the ions drawn through the membranes to form the acid sanitizer and base cleaner. To this end, the housing 30 includes a fresh water inlet 50, in this case at the upper end of one of the sidewalls 32 of the housing (see FIGS. 5, 6 and 13). Outlets 52 for the formed chemicals are arranged, in this case, at the lower end of one of the sidewalls 32 of the housing 30 (see FIGS. 5, 6 and 14). As a result, in the illustrated embodiment, the water/chemicals flow downward from the top of the cells 14 and exit at the bottom of the cells 14. The flow of water/chemicals through the interior of the cells is shown diagrammatically with arrows in FIGS. 13 and 14 with the flow of the water being shown with arrows 53, the flow of the base cleaner being shown with arrows 54 and the flow of the acid sanitizer being shown with arrows 56 in FIG. 14.

Figure 8:
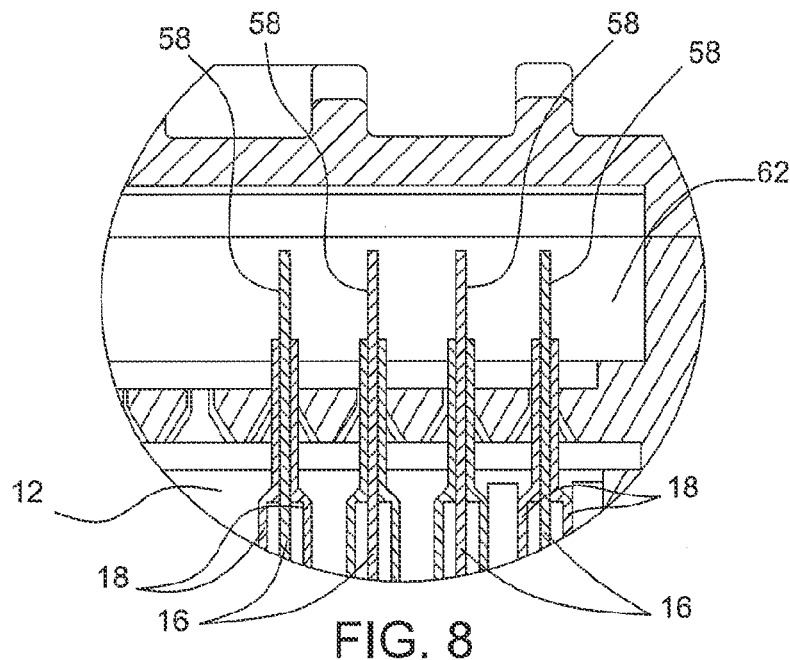
FIG. 8 is an enlarged detail view of ends of the electrolytic cells of the embodiment of FIG. 5 at the fresh water inlet side of the system.
Figure 13:
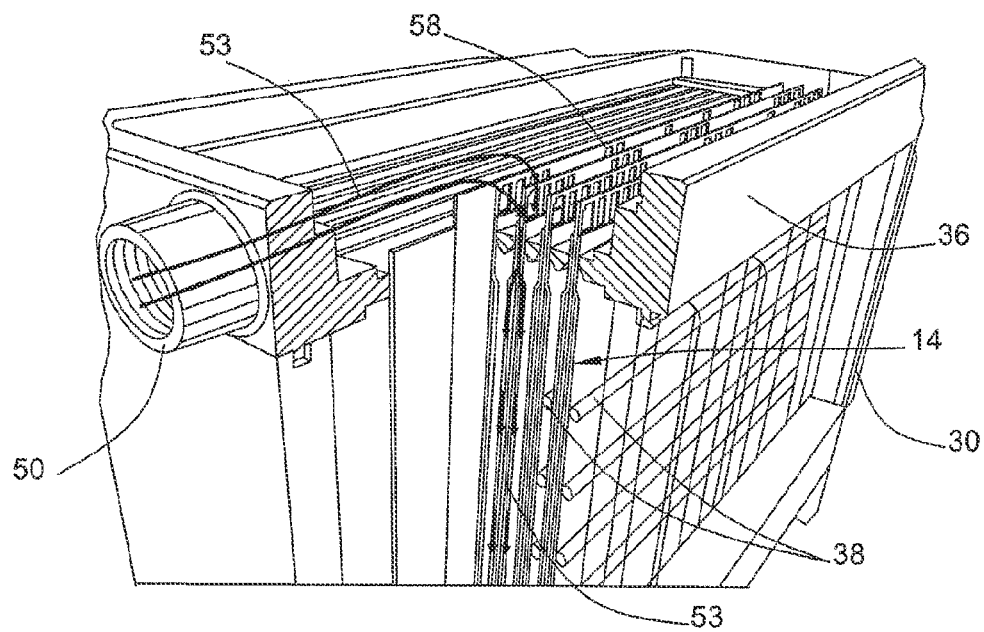
FIG. 13 is a partially cutaway end perspective view showing the water and chemical product flow through the electrolyzing system of FIG. 5.
Figure 14:
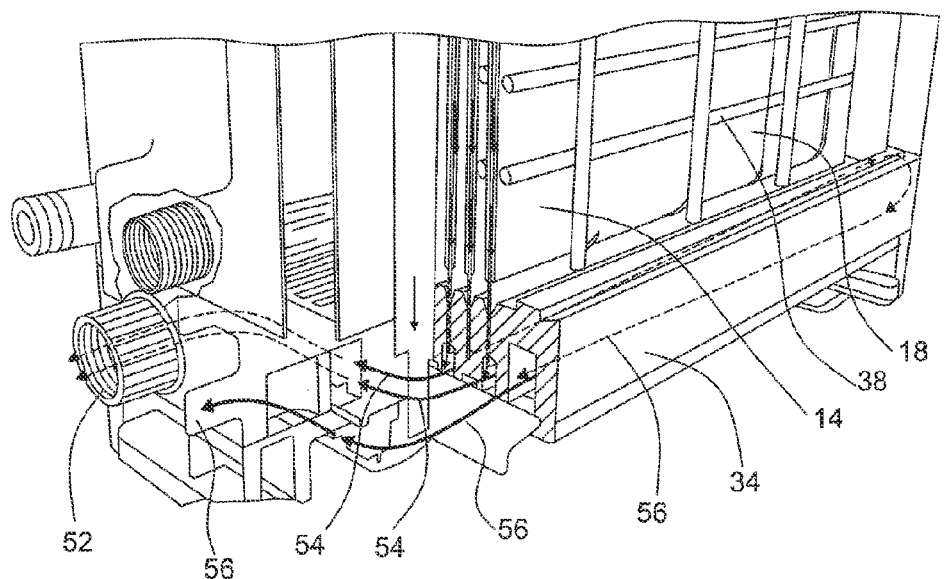
FIG. 14 is a partially cutaway end perspective view showing the chemical product flow out of the electrolyzing system of FIG. 5.

To facilitate the flow of water/chemicals through the inner spaces between the membranes 18 and the electrode plate, the cells 14 include a plurality of entry passages 58 along the upper edge thereof and exit passages 60 along the lower end thereof as shown, for example, in FIG. 6. In this case, the entry and exit passages 58, 60 are defined by slots in the electrode plate (see, e.g., FIG. 13). The entry passages 58 along the upper end of the cells 14 connect to a fresh water distribution chamber 62 that is in communication with the fresh water inlet 50 as shown in FIGS. 8 and 13. Similarly, the exit passages 60 along the opposing lower edge of the cells 14 connect to chemical collection areas 64 that are in communication with the respective chemical outlets 52 through which the acid sanitizer or base cleaner formed in the cell 14 can be drawn out of the system 10 (see FIGS. 9 and 14) via distribution channels provided in the base 34 of the housing 10. Separate collection areas 64 and distribution channels are provided for the cells 14 with positively charged electrode plates 16 and those with negatively charged electrode plates 16 to keep the formed acid sanitizer and base cleaner separated as best shown in FIG. 9. The fresh water distribution chamber 62 in the cover plate of the housing and the chemical collection areas 64 in the base of the housing should be sealed off from the brine bath to prevent any contamination from the brine.

A further embodiment of an electrolyzing system 10 is shown in FIGS. 15-20. This embodiment has similarities to the other disclosed embodiments and for ease of reference like components have been given the same reference numbers in the figures. The main difference between this embodiment and the embodiment of FIGS. 5-14 lies in the way the water/chemicals flow through the system 10 and the resultant location of the various inlets and outlets. In particular, with the embodiment of FIGS. 15-20, the fresh water inlet 50 and the chemical outlets 52 are both arranged in the top of the housing 30. Because of this arrangement, the water/chemical flow first travels down one cell 14, then is directed across to another like charged cell 14 and then up that cell where it then exits the system.

Figure 19:
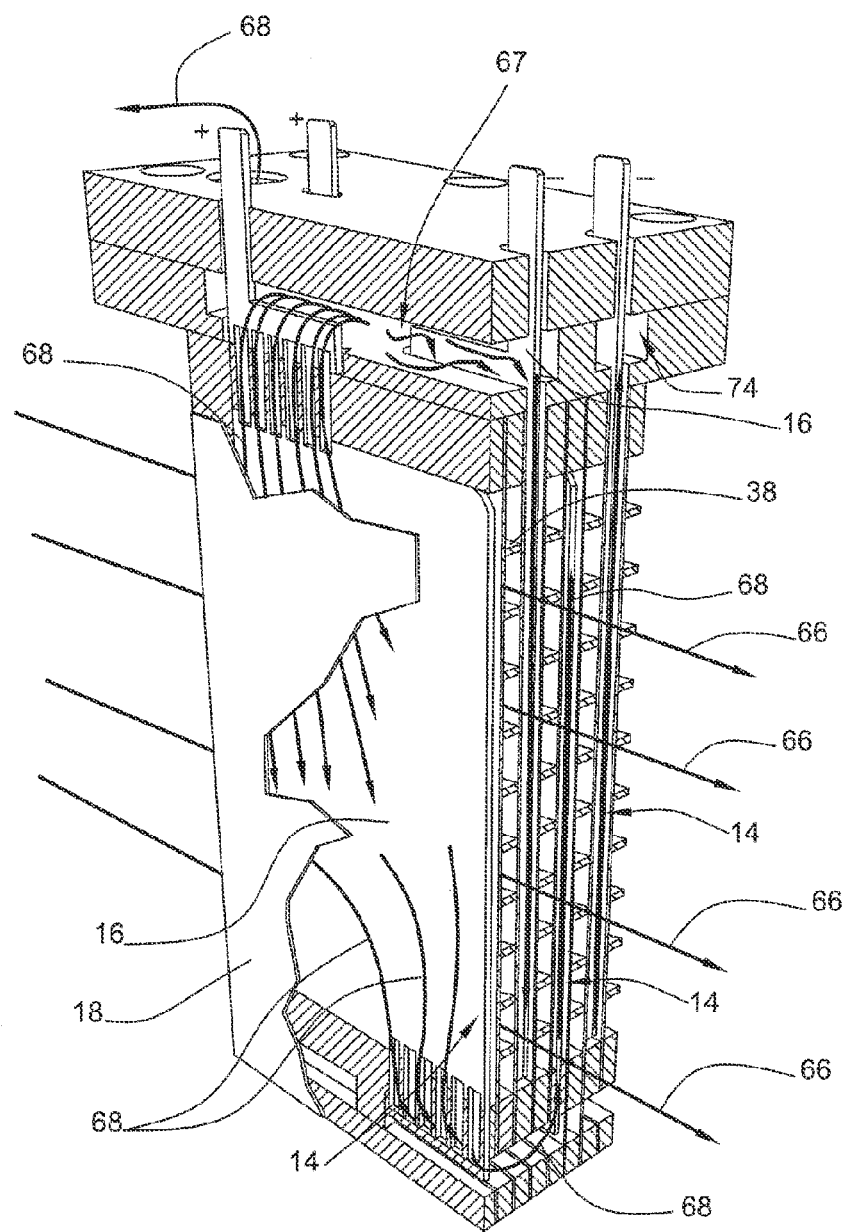
FIG. 19 is a partially cutaway sectional view showing the flow of brine, water and chemical product through the electrolyzing system of FIG. 15.
Figure 20:
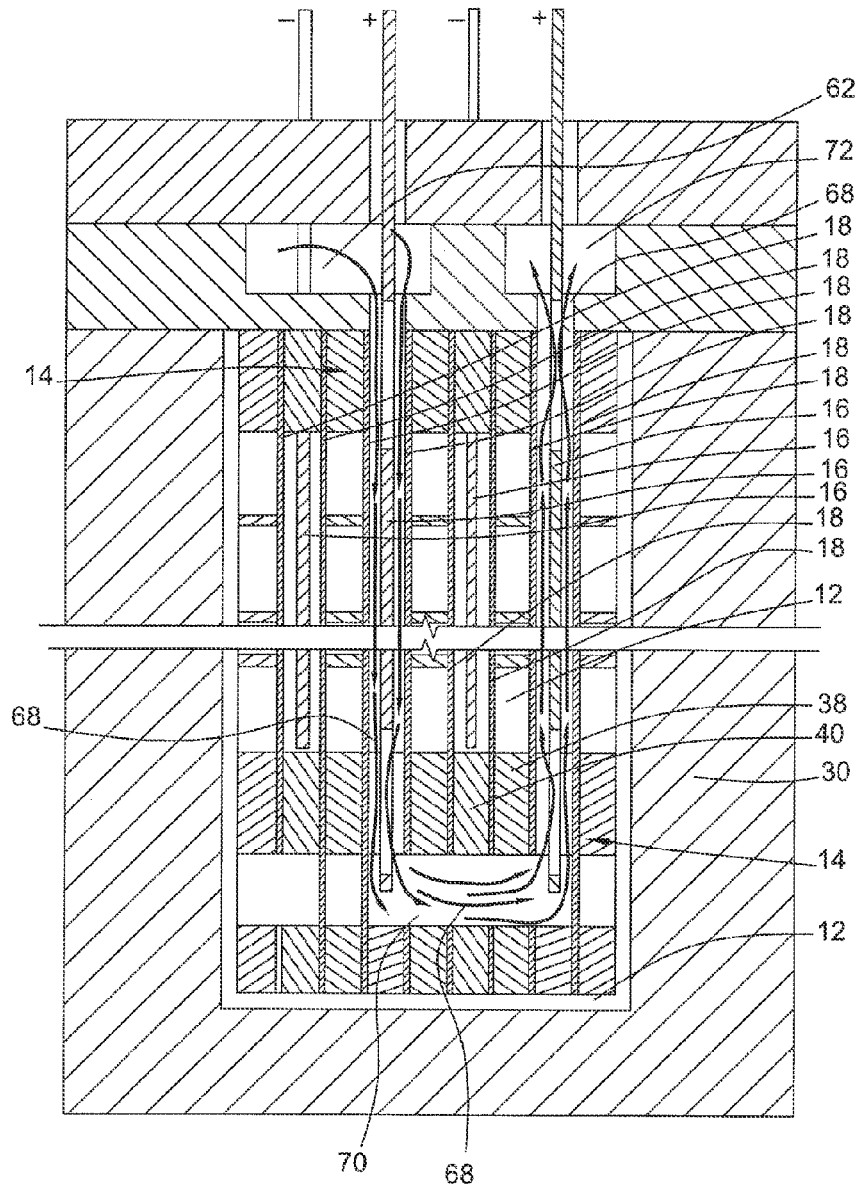
FIG. 20 is a partially cutaway sectional view showing the flow of brine, water and chemical product through the electrolyzing system of FIG. 15.

FIG. 19 diagrammatically shows with arrows both the brine flow (arrows 66), fresh water flow (arrows 67) and chemical flow (arrows 68) through the system. The brine flow past the outer surfaces of the membranes 18 of the individual cells 14 is generally the same as that described in connection with the previously described embodiments. The flow of the water/chemical is shown in greater detail in FIG. 20 with respect to the flow associated with the positively charged electrolytic cells 14. In FIG. 20, fresh water is shown entering a positively charged electrolytic cell 14 through the upper end thereof into the interior space between the electrode plate 16 and the associated membranes 18. It then travels downward through the cell 14 until it reaches the bottom. It then exits the cell 14 and travels via a distribution channel 70 to the cell one over, which is the next nearest positively charged cell 14. The water/chemical then enters that cell 14 at the lower edge thereof and travels upward through the cell until it exits the cell at the upper end. The top plate of the housing includes separate distribution channels 72, 74 for the two chemical products (i.e., separate distribution channels for the outlet of the positively charged cells and for the outlet of the negatively charged cells) to direct the products to their respective outlets 52.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An electrolyzing system for electrolyzing a brine solution of water and an alkali salt to produce acidic electrolyzed water and alkaline electrolyzed water, the system comprising:
   a housing including an internal chamber for receiving the brine solution and defining a brine bath;
   a first electrolyzer cell arranged in the internal chamber of the housing with the first electrolyzer cell being immersed in said brine bath, the first electrolyzer cell including a first electrode that is connectable to an electrical supply which positively charges the electrode and a pair of cation permeable membranes disposed on opposite sides of the first electrode so as to define a first space between the pair of cation permeable membranes within which the first electrode is located and into which cations from the brine solution can enter through both cation permeable membranes, said first space being in communication with a fresh water supply at an inlet end of the first space and in communication with a cleaning chemical outlet at an outlet end of the first space, said first space being sealed off from the brine bath such that the only path for brine to enter the first space is through the pair of cation permeable membranes; and
   a second electrolyzer cell arranged in the internal chamber in the housing with the second electrolyzer cell being immersed in said brine bath, the second electrolyzer cell including a second electrode that is connectable to an electrical supply which negatively charges the electrode and a pair of anion permeable membranes disposed on opposite sides of the second electrode so as to define a second space between the pair of anion permeable membranes within which the second electrode is located and into which anions from the brine solution can enter through both anion permeable membranes, said second space being in communication with a fresh water supply at an inlet end of the second space and in communication with a cleaning chemical outlet at an outlet end of the second space, the second space being sealed off from the brine bath such that the only path for brine to enter the second space is through the pair of anion permeable membranes.

2. The electrolyzing system of claim 1, wherein each of the first and second electrolyzer cells includes a cartridge housing on which the respective membranes and electrode are supportable.

3. The electrolyzing system of claim 1 wherein the first and second electrolyzer cells are arranged in spaced parallel relationship to each other in the brine bath so as define an area therebetween into which the brine can flow.

4. The electrolyzing system of claim 1 in which said electrodes and membranes of said first and second cells are disposed in parallel relation to each other.

5. The electrolyzing system of claim 1 in which said electrode and membranes of said first electrolyzer cell are a part of a first electrolyzer cell cartridge, and said electrode and membranes of said second electrolyzer cell are part of a second electrolyzer cell cartridge, and said cartridges each being individually assembleable in said housing.

6. The electrolyzing system of claim 1 including at least a third electrolyzer cell and at least a fourth electrolyzer cell, said third electrolyzer cell having the same polarity as said first electrolyzer cell and said fourth electrolyzer cell having the same polarity as said second electrolyzer cell, and said electrolyzer cells each being immersed in said brine bath with the electrode plates and membranes of each cell in parallel relation to each other.

7. The electrolyzing system of claim 6 in which said electrolyzer cells are arranged in said brine bath with the respective electrodes of adjacent cells oppositely electrically charged.

8. The electrolyzing system of claim 1 in which the membranes of each electrolyzer cell are disposed in spaced relation to opposite sides of the respective electrode.

* * * * *